UNITED STATES PATENT OFFICE.

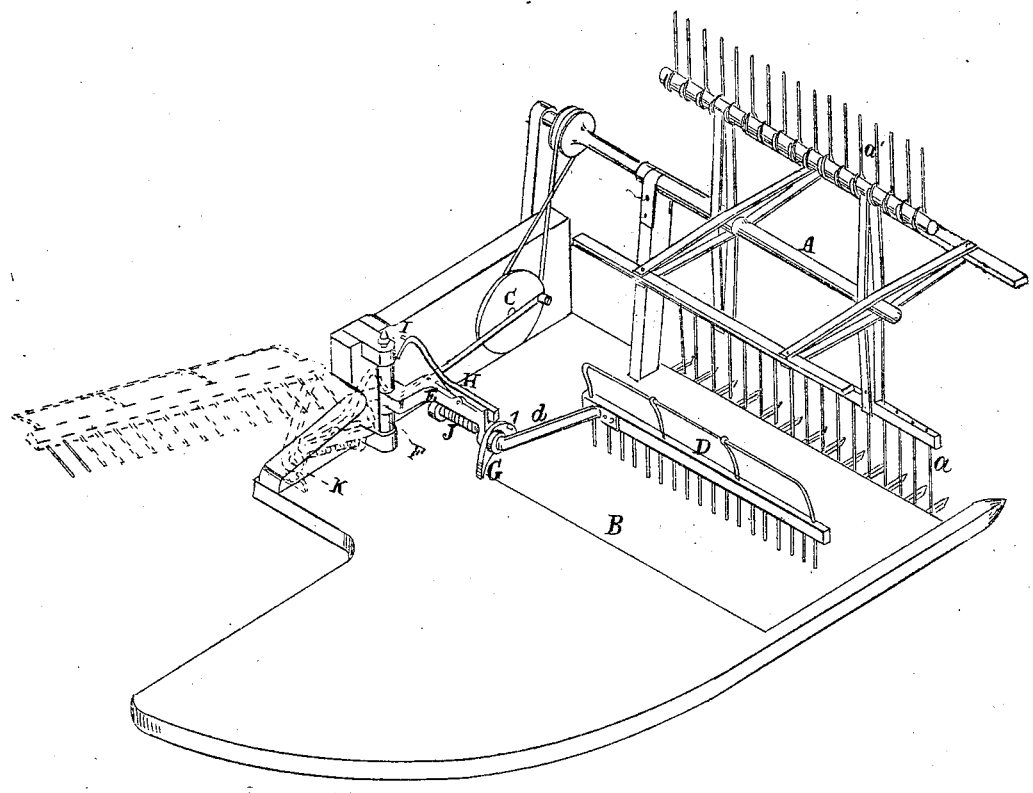

JOSEPH D. LOVELAND, OF WHEATFIELD, ASSIGNOR TO DAYTON S. MORGAN, OF BROCKPORT, NEW YORK.

IMPROVEMENT IN HARVESTER-RAKES.

Specification forming part of Letters Patent No. 53,740, dated April 3, 1866.

*To all whom it may concern:*

Be it known that I, JOSEPH D. LOVELAND, of Wheatfield, in the county of Niagara and State of New York, have invented a new and useful Improvement in Harvesters, of which the following is a full, clear, and exact description, reference being had to the accompanying drawings, which make part of this specification, and which represent a view in perspective of so much of a harvester as is necessary to illustrate my invention.

My invention relates to that class of harvesters in which the gavels are discharged from the platform by a vibrating sweep-rake. In machines of this class much difficulty has heretofore arisen in discharging short grain and clover for seed. As it is necessary that the reel-ribs should rotate very near the platform, and that the rake should strike, in its descent, very close to the finger-beam, it is almost impossible to avoid collisions between the reel and rake, which are liable to injure the machine and scatter the grain.

Now it is the object of my invention to overcome the above-mentioned and other objections; and to this end my invention consists in placing teeth of brushes upon the reel-ribs to sweep the grain back upon the platform and arranging the rake so as to strike far enough back of the finger-beam to avoid striking the reel, even in its lowest position.

In the accompanying drawings, which exemplify one way of carrying out the objects of my invention, a reel, A, is shown as mounted on a frame or platform, B, and driven from a pulley, C, or in any other well-known way.

Teeth *a a'* are inserted into the reel-ribs, so as to form a rake or comb to sweep the grain back upon the platform. The form of these teeth may be varied without departing from the spirit of my invention. For instance, the teeth *a* are simply wires inserted directly into the ribs, while the teeth *a'* consist of wires coiled around the ribs (like horse-rake teeth) in order to give them greater elasticity. Brushes of bristles, whalebone, or other substance may likewise be used instead of wires, if preferred.

A vibrating sweep-rake, D, is mounted on a crank-arm, *b*, pivoted to turn axially in a bracket, E, projecting from a crane-post, F, and in this instance vibrated from a crank or wrist pin on the pulley C, which drives the reel. A lug, G, is secured to the crank-arm (where it bends) and is provided on its upper edge with a notch, 1. A latch, H, falls into this notch and is pivoted to play vertically in the bracket E. Its inner end is curved so as to strike a projection or stop, I, at the proper moment to release the rake.

The following is the operation of my invention: As the grain is cut it is swept back upon the platform by the reel. At the proper moment the rake advances in an elevated position. As it reaches the limit of its forward movement the stop I releases the latch H from the notch 1 and allows the rake to fall upon the platform, its descent being accelerated by a spiral spring, J, coiled around the crank-arm *d*. The rake then retracts and discharges the grain from the platform. At the moment of discharge the lug G strikes the stop K and lifts the rake until the notch 1 comes under the latch I, which is thrown into it by a spring underneath it, thus locking the rake in position for its forward movement, as before described.

The teeth, by reason of their elasticity, yield in case they strike the finger-beam or rake, and thus avoid shocks to the machine, and can be run close enough to the platform to sweep off the shortest grain. They also prevent cut grain or clover or grass from again falling upon the cutters and being chopped up.

What I claim as my invention, and desire to secure by Letters Patent, is—

The combination, in a harvester, of teeth or brushes on the reel-ribs to sweep the grain upon the platform with a vibrating sweep-rake to remove it therefrom, the combination being and operating substantially as described.

In testimony whereof I have hereunto subscribed my name.

JOSEPH D. LOVELAND.

Witnesses:
JOHN BEEBE,
BARTON ELLIS.